(12) United States Patent
Fare'

(10) Patent No.: US 8,585,388 B2
(45) Date of Patent: Nov. 19, 2013

(54) PROCESS AND APPARATUS FOR THE PRODUCTION OF NONWOVEN FABRICS FROM EXTRUDED FILAMENTS

(75) Inventor: Rosaldo Fare', Fagnano Olona (IT)

(73) Assignee: Fare' S.p.A. (IT)

( * ) Notice: Subject to any disclaimer, the term of this patent is extended or adjusted under 35 U.S.C. 154(b) by 722 days.

(21) Appl. No.: 12/518,113

(22) PCT Filed: Dec. 17, 2007

(86) PCT No.: PCT/IT2007/000877
§ 371 (c)(1),
(2), (4) Date: Jun. 29, 2009

(87) PCT Pub. No.: WO2008/072278
PCT Pub. Date: Jun. 19, 2008

(65) Prior Publication Data
US 2010/0099321 A1    Apr. 22, 2010

(30) Foreign Application Priority Data

Dec. 15, 2006  (EP) ..................................... 06425841
Aug. 1, 2007  (IT) .............................. MI2007A1585

(51) Int. Cl.
*D01D 5/096* (2006.01)
(52) U.S. Cl.
USPC ................. 425/72.2; 264/211.13; 264/211.14

(58) Field of Classification Search
USPC ........................ 425/72.2; 264/211.14, 211.13
See application file for complete search history.

(56) References Cited

U.S. PATENT DOCUMENTS

| | | | | |
|---|---|---|---|---|
| 3,274,644 A | * | 9/1966 | Massey et al. | 425/72.2 |
| 3,705,227 A | * | 12/1972 | Fintel et al. | 264/211.14 |
| 3,737,508 A | * | 6/1973 | Weir | 264/204 |
| 6,881,047 B2 | * | 4/2005 | Smith et al. | 425/72.2 |
| 2003/0178742 A1 | * | 9/2003 | Geus et al. | 264/211.22 |

FOREIGN PATENT DOCUMENTS

| | | |
|---|---|---|
| GB | 1532821 A | 11/1978 |
| WO | 98/29583 A | 7/1998 |
| WO | 03/072866 A | 9/2003 |

* cited by examiner

*Primary Examiner* — Galen Hauth
(74) *Attorney, Agent, or Firm* — Hess Patent Law Firm LLC; Robert J. Hess

(57) ABSTRACT

In an apparatus for the production of a non-woven fabric, a plurality of filaments (11) are extruded by a spinneret (2) into at least two groups spaced from each other to define an area of the cooling chamber without filaments and structures; the filaments are cooled by an air flow (Y) conveyed into the cooling chamber directed towards an intermediate area between said two groups of filaments, said area being located below an area of the spinneret without extrusion holes.

7 Claims, 8 Drawing Sheets

PROCESS AND APPARATUS FOR THE PRODUCTION OF NONWOVEN FABRICS FROM EXTRUDED FILAMENTS

FIELD OF THE INVENTION

The present invention relates to a process and an apparatus for the production of non-woven fabrics from extruded filaments; in particular, the invention relates to a process and a device for the production of yarns stretched in a current of air (i.e. by aerodynamics) and formed into a layer of non-woven fabric of the type known as spunbond, by means of an improved filament cooling process.

A typical apparatus for the production of spunbond yarns comprises a spinneret fed by extruders, a cooling chamber where the filaments undergo a first partial cooling, a stretching unit and a deposition unit where the stretched filaments are deposited on a mobile support where the required non-woven fabric is formed. All these modules (extrusion, cooling, stretching and deposition) are very important for obtaining a good end product.

Among said modules, particular importance attaches to the cooling chamber or unit located immediately downstream of the extruder spinneret. Air is fed into said chamber to partially cool the filaments extruded by the spinneret, i.e. the filaments are solidified to such a degree that they can be stretched to the required dimensions in the subsequent step of exposure to high-speed air.

STATE OF THE ART

U.S. Pat. No. 3,705,227, describes an apparatus for the production of yarns which comprises a circular spinneret to extrude a plurality of filaments and radial type cooling chamber to cool said filaments by means of cooling air flows. The cooling chamber is provided with a central cone, i.e. a closed conical element which extends for a certain distance into the bundle of filaments. The conical element negatively affects the cooling air flows and is subject to heating, as it accumulates heat, with obvious negative effects on filament cooling efficiency.

The international patent application WO 2006/024435 concerns an apparatus and a process for cooling synthetic yarns exiting the relative spinnerets. In the cooling chamber, located below a spinneret, two cooling areas are provided. A first area is the one immediately below the spinneret and receives cooling air in a transverse direction, to cool the filaments exiting the spinneret. The second cooling area is provided below the first, i.e. downstream of the first cooling area with respect to the direction in which the filaments fall out of the spinneret. After cooling the hot filaments exiting the spinneret, the cooling air is conveyed towards the second cooling area in the lower portion of the chamber, after being cooled in a suitable heat exchanger.

U.S. Pat. No. 5,028,375 describes a process and a device in which two different bundles of filaments are extruded by two separate spinnerets into two separate bundles. To cool the filaments, a chamber is provided which receives air crosswise to the filament bundles, which are separated by at least one wall. The separation wall can act as a blower element which feeds in cooling air.

IT 1245831, in the name of the applicant Farè, describes an annular spinneret inside which two cooling chambers are located which feed to the extruded filaments two air flows at different temperatures and speeds to gradually cool the bundle of filaments. For said purpose, the cooling air flows are superimposed vertically with the upper flow having a higher temperature than the lower flow. The cooling air flows are directed from the centre towards the outside of the annular bundle of filaments.

This concept of two cooling chambers which direct flows with different temperatures and speeds onto the bundle of filaments has been recently used in the application US2003/0178742 in the name of Reifenhauser. This application describes an apparatus for the production of a spunbond non-woven web in which the cooling area of the filaments exiting the spinneret features a plurality of chambers, generally two, to which air at different temperatures is fed to accelerate cooling of the filaments and thus increase the rate of production. The cooling air flows are directed from the walls of the cooling chamber (they are fed through holes obtained in said wall) towards the moving filaments.

Furthermore, according to said patent, the cooling air is fed to the filaments in a passive way, i.e. it is dragged along by the filaments which move at high speed towards the bottom of the apparatus.

In the solution described above, the cooling air dragged along by the filaments enters the filament-stretching duct below and therefore influences and interferes with the conditions of the stretching area, or lower area, of the apparatus. In other words, there is no pneumatic separation between cooling area and stretching area. Control of the cooling air flows is very important because it directly affects the filament quality and production rate, i.e. the production capacity of the spinning plant and production of the end non-woven fabric.

The object of the present invention is to solve the above-mentioned problems, providing a process and an apparatus for the production of spunbond non-woven fabrics which enables gradual cooling of the filaments while operating at high speed.

A further object of the present invention is to solve the problems of the known solutions, maximising spinning quality and speed and at the same time maintaining pneumatic separation between cooling area and filament-stretching area.

SUMMARY OF INVENTION

Said objects are achieved by means of the present invention which relates to a process for the production of non-woven fabrics by extrusion of a plurality of filaments, cooling of said filaments, stretching of the filaments and their deposition on a mobile support in the form of non-woven fabric, characterised according to claim 1.

As will be discussed in further detail in the following description, the process provides for the extrusion of two bundles of filaments separated from each other by a space, and at least part of the cooling air flow being made to pass twice through each filament bundle, the second passage being in a position closer to the extruder spinneret, i.e. where the filaments are hotter. In this way, the air that contacts the filaments in the first passage is heated and when it crosses the bundle in the second passage it has a higher temperature than initially. In this way the filaments are gradually cooled, first coming into contact with warmer air and then with cooler air.

The cooling air is fed into the cooling chamber initially towards an intermediate area between the two bundles of filaments, called the expansion area, provided below the spinneret. In other words, the cooling air flow or flows enter the relative chamber at an angle with respect to the vertical plane of the chamber, for example at an angle of approximately 45 degrees with respect to the vertical, or slanting upwards, and directed towards the expansion area intermediate to the groups of filaments exiting the spinneret, which is a space free from filaments and parts of the device, where the heated air can expand in a type of plenum.

In practice, the intermediate expansion area corresponds to and is below a portion of the spinneret without extrusion holes, between the two groups of extrusion holes; said area is without any physical structure for cooling or separating the air flows, but may be provided with suction ducts. A further subject of the invention is an apparatus for performing the above process, characterised according to claim 6.

According to the invention, the filaments are extruded in two groups separated from each other by a portion of spinneret that is wide enough to become, inside the cooling chamber, an expansion area for the air after the first passage through the filament bundles. The two bundles, initially substantially parallel, are then fed to a stretching duct where they are re-combined into one single bundle. Suitable deflectors have the function of directing at least part of the cooling air flow or flows towards the intermediate expansion area between two or more groups of extruded filaments falling out of the spinneret.

In one embodiment of the present invention, at least a part of the cooling air is extracted directly from the intermediate expansion area to the groups of filaments, by means of one or more suction apertures obtained in the spinneret, in an intermediate position between the groups of extrusion holes.

In other words, the process provides for part of the cooling air flow which passes through the filament bundles to be removed via at least one, and preferably via a plurality of outlets arranged between said spinnerets, i.e. in the central area between the filament extrusion holes. The outlet or outlets for the air on the spinneret are configured (in terms of dimensions and suction power) to remove 10% to 40% of the cooling air flow conveyed into the cooling chamber by lateral fans or analogous means. In this way the quantity of monomers present in the expansion area is minimised and the thermal gradients in the cooling chamber are optimised.

According to a further aspect of the invention, in addition to the first cooling flow described above, a second flow is used which is conveyed to the filament bundles in a direction substantially perpendicular to the same, i.e. horizontal. The temperature of the second flow can be below that of the first flow.

According to a further aspect of the invention, at the lower end of the cooling chamber there is a pressure balancing area provided with flow deflector. The flow deflector has the function of balancing the pressures and splitting the air flow to be discharged to the outside.

The invention has numerous advantages with respect to the known art. The air heated by the first passage through the filaments can be recycled to cool the more upstream filaments, at a distance within the range of approximately 50 to 250 mm from the extruder spinneret, thus providing a more gradual uniform cooling than that obtainable with the known methods. This improved cooling permits greater stretching of the filaments and they can therefore be spun with very fine counts, up to 0.9 dtex in mono-component filaments and 0.05-0.3 dtex in bi-component split and/or side-by-side filaments.

Filaments with such low counts allow non-woven fabrics to be produced that can be used for filters and products that are required to have a barrier action for fluids, for example surgical overalls and masks for medical and hospital use.

Furthermore, cooling is much improved and it is possible to reduce from 10% to 50% the temperature of the air in the area between the filaments exiting the spinneret; this provides more uniform cooling of the filaments thus enhancing the quality of the filaments, which have a very uniform count.

In addition to this quality advantage, the invention also provides a quantitative advantage; the presence of two groups of filaments coming out of a double spinneret, i.e. two spinnerets, permits a considerable increase in the production of non-woven fabric since the cooling method of the invention is equally effective but less violent than the traditional cooling process and allows optimal cooling of the two bundles, thus increasing hourly throughput up to 700/750 kg/h. This increase in productivity can be as much as 30% with respect to the known art.

DESCRIPTION OF THE FIGURES

The invention will now be described in greater detail with reference to the drawings enclosed for illustrative and non-limiting purposes in which.

DISCLOSURE OF EMBODIMENTS OF THE INVENTION

Figure 1:
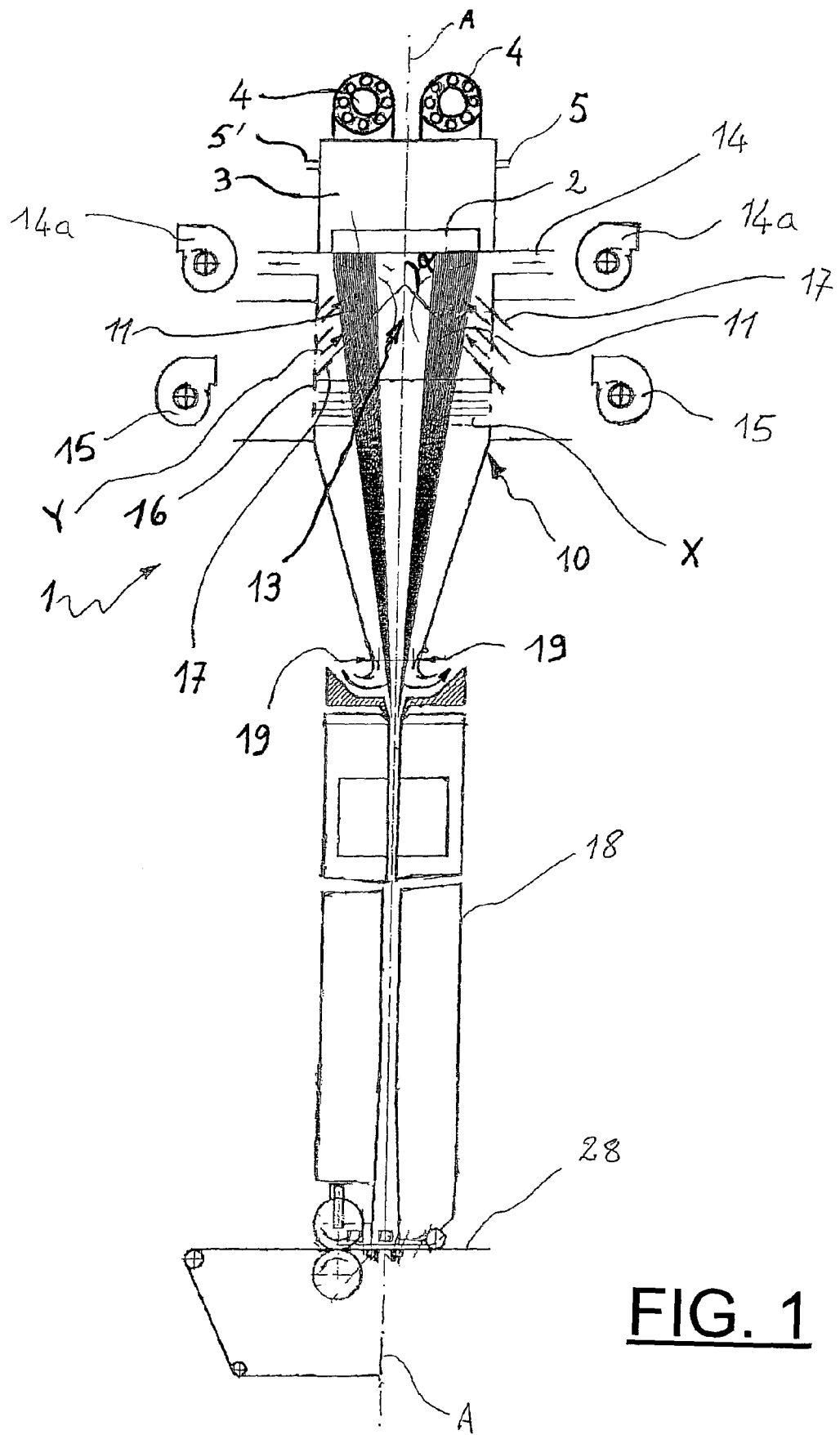
FIG. 1 is a schematic lateral view of the apparatus according to the present invention.

With reference to FIG. 1, the apparatus 1 for the production of a non-woven fabric of filaments according to the present invention provides for an extrusion head 3, comprising a spinneret 2 to extrude a plurality of filaments, to which one or more extruders (not shown) are connected for the extrusion or co-extrusion of mono, bi or tri-component filaments, as known in the art and as described and claimed for example in the patent applications EP-A-00112329.8 and EP-A-96830305.7, both in the name of Fare.

The polymer is distributed to the holes of the spinneret 2 by means of satellite gear pumps 4, generally two to eight-way. There is at least one pump for each type of polymer and in the embodiment shown there are two satellite pumps 4, each of which feeds a section of the spinneret 2. In the case of a process in which two different polymers are used, as in the production of co-extruded skin-core fibre, for each portion of spinneret, two pumps 4 will be required to feed the two different polymers. In this case, the two polymers are fed by two different inlets 5 and 5' of the extrusion head 3. The channels for distribution of the polymer from the pump to the holes of the spinneret 2 are sized (length and section) to ensure uniform pressure losses on all the holes, in a way already known in the art, for example all having identical length and section.

Figure 12:
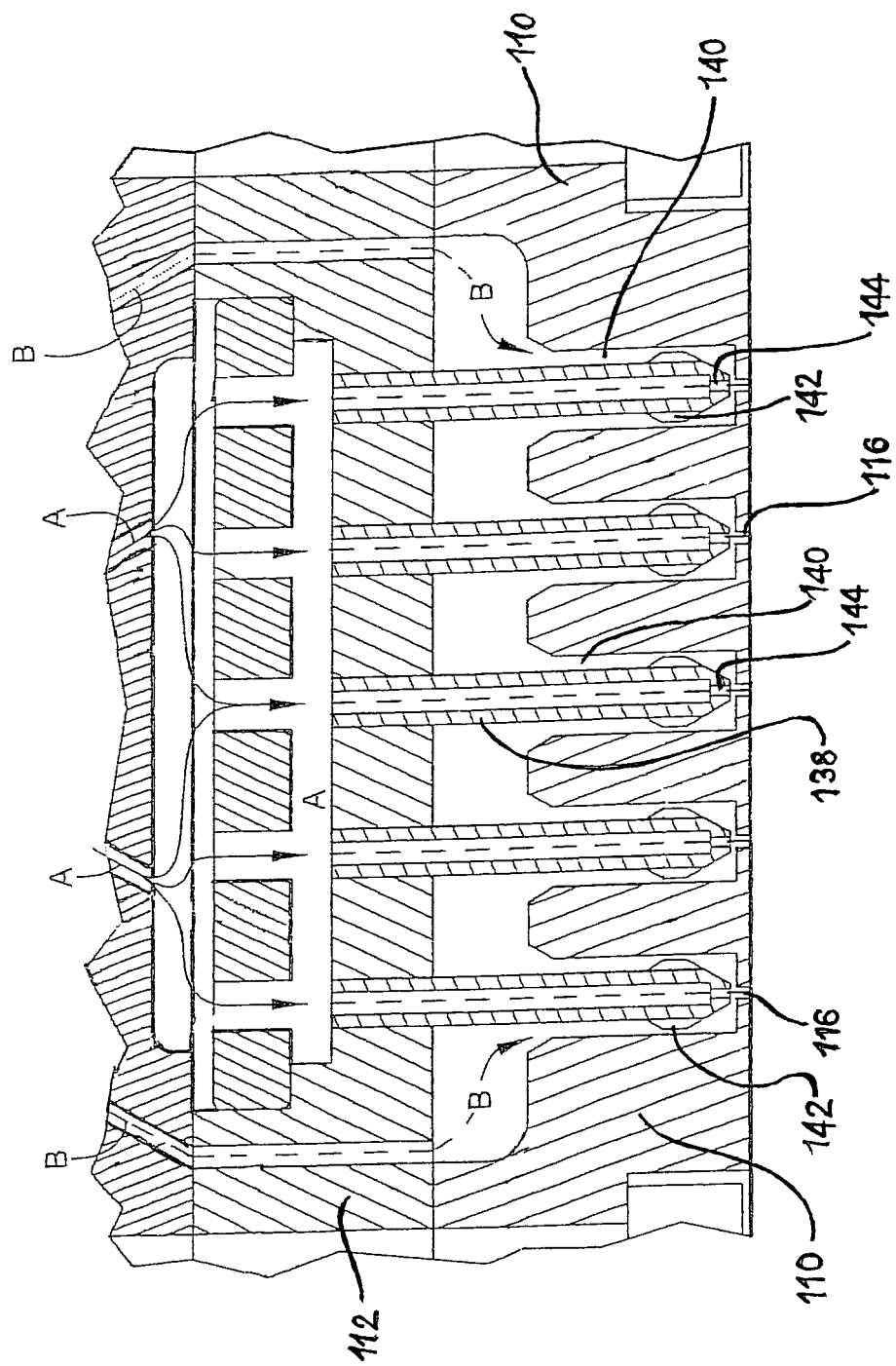
FIG. 12 is a schematic section view of an extrusion head suitable for use with the device according to the present invention.

The extrusion head and the spinneret 2 are produced preferably as described in the European patent no. 0995822 and in the U.S. Pat. No. 6,168,409 in the name of Fare; these patents (included here by reference) describe an extrusion device particularly suited to the production of spunbond yarns with two or more polymers like those discussed here. The device of EP 0995822, shown in FIG. 12 of the present description, comprises a first extrusion spinneret 110 provided with a plurality of extrusion ducts 140 and holes 116 for a polymer B and a second spinneret 112 having a second plurality of holes 144 and ducts 138 for extrusion of a polymer A, in which the extrusion holes and ducts are coaxial and aligned with one another to obtain the co-extruded structure required for the filament. From the spinneret 112, located upstream (with respect to the flow of the polymers) of the first spinneret 110, the extrusion ducts 138 extend into the ducts 140 of the first spinneret 110 until they are close to the extrusion holes 116, i.e. close to the nozzles 116 from which the two (or more) polymers are extruded.

The extrusion ducts of the second spinneret 112 are made of a material, generally steel, sufficiently flexible to permit the movements necessary to compensate for the different thermal expansions to which the two spinnerets 110 and 112 are subjected during their operation due to the different extrusion temperatures of the polymers A and B. Means are also provided for maintaining aligned and coaxial the flexible steel ducts 138 with the ducts of the spinneret in which they are housed; said means comprise, for example, fins or projections 142 provided on the terminal portion of the flexible duct.

The spinneret as described above makes it possible to produce very wide spinnerets, i.e. with co-extrusion widths of even six meters achieved with one single spinneret, which is not possible with the traditional spinnerets.

The apparatus according to the invention can also comprise more than one spinneret to obtain the same extrusion width or the same spinneret width. For greater simplicity, in the present description the term spinneret is intended to mean the device that comprises the filament extrusion holes, regardless of the number of elements that make it up. Preferably, the spinneret 2 is provided with a plurality of holes 6 for forming the filaments into two groups 7 and 8, said groups being preferably parallel and in any case always separated from each other by means of an area 9 of the spinneret 2 without holes 6.

Figure 2:
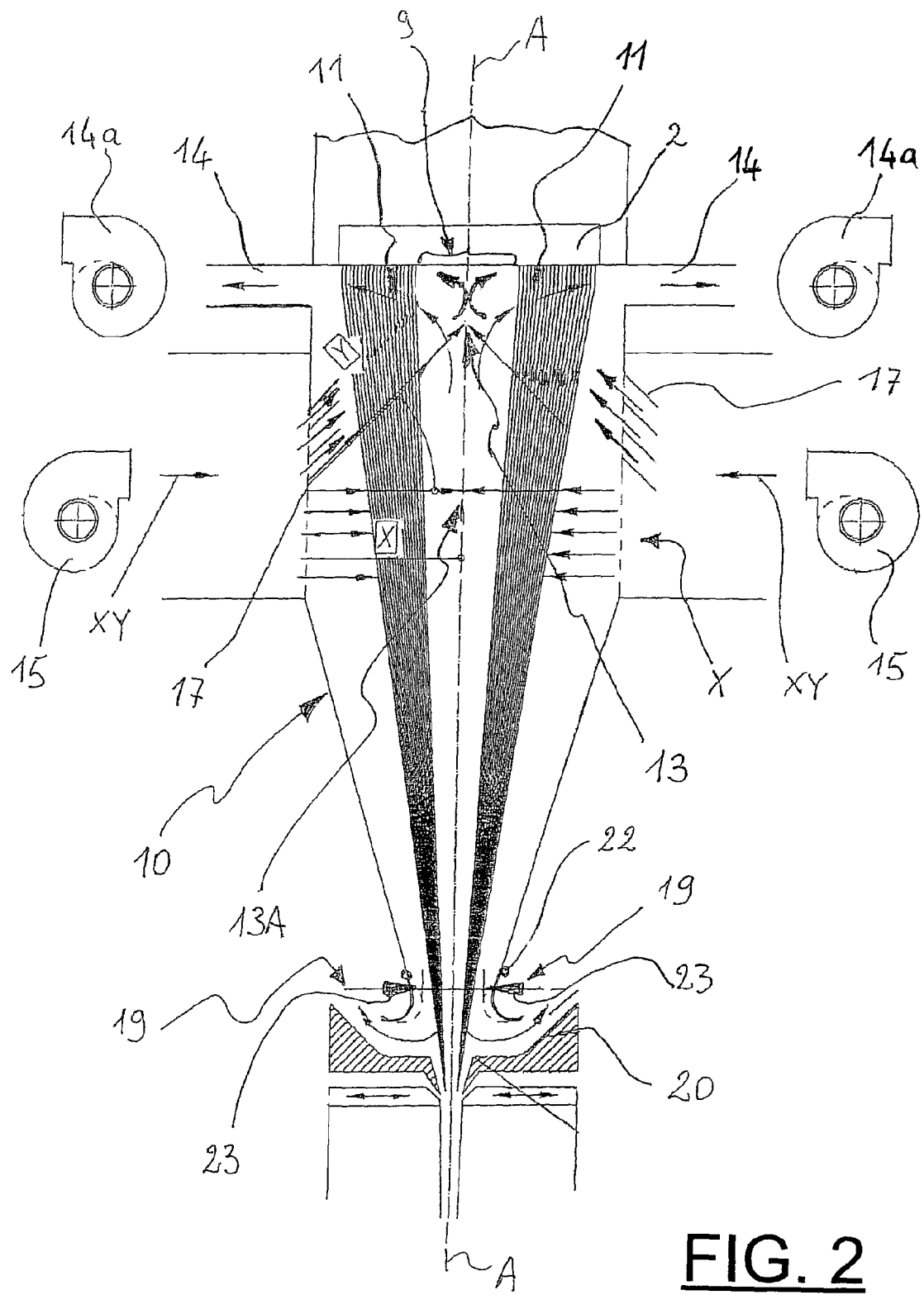
FIG. 2 is an enlarged view of the cooling chamber of the apparatus of FIG. 1.

The portion 13 (FIG. 1-2) of the cooling chamber located below the area 9, without holes, is therefore empty, i.e. free from filaments or parts of the device, providing an area for expansion of the air heated when crossing the filaments. Again, it should be underlined that this "empty" or "free" area 13 below the spinneret receives air also because the air is directed to it by the deflectors of the device, as discussed below.

The ratio between the width L2, i.e. the sum of the width of the holes containing areas 7 and 8 and the area without holes 9, and the width L1 of the area 9 is L2/L1 and is within the range of 2 to 5. The distance between the holes in a direction transverse to the spinneret (width L2) and in the longitudinal direction (i.e. perpendicular to the width L2) can be constant or variable. In the preferred embodiment shown, the transverse distance between the holes increases from the end to the central part of the spinneret, i.e. from the end to the area L1. The purpose of such an arrangement will be clarified in the following description.

A cooling chamber 10 is connected to the extrusion head 3 to cool the filaments exiting the spinneret 2 by means of cooling air flows, before the filaments 11 pass into the stretching duct 12 below. According to the present invention, the cooling chamber 10 comprises means for conveying at least one air flow which crosses at least part of the filaments 11 and which is directed towards the cooling air expansion area 13, and outlet means 14 for the removal of at least part of said cooling air flow from the cooling chamber 10. In particular, part of the cooling air flow is removed from the cooling chamber after said air flow has re-crossed the filaments at a different point from where they were crossed the first time. As described below, in one embodiment of the invention (FIGS. 13 and 14) part of the air arriving in the expansion area 13 is removed without re-crossing the filaments.

The means for conveying the cooling air comprise fans 15 which send a flow of air to the walls 16 of the cooling chamber 10; the walls 16 are provided with holes and deflectors 17 positioned outside or inside the chamber 10 to direct an air flow Y, angled towards the upper part of the chamber 10, towards the expansion part 13 of the chamber.

As can be seen, the cooling air flow Y crosses the filaments 11 and is directed at an angle straight towards the expansion area 13 which corresponds to the space of the chamber 10 below the non-perforated portion 9 of the spinneret 2. The planes of the deflectors 17 form with the vertical axis A of the apparatus an angle $\alpha$ that is within the range of 80 to 45 degrees and preferably around 70 degrees, i.e. the complementary upper angle $\beta$ formed by the deflectors 17 with the vertical wall of the cooling chamber 10 is within the range of 10 to 45 degrees, preferably around 20 degrees.

The outlet means comprise at least one outlet duct 14 connected to an extractor 14a and are positioned above the inlet means 15-17 so that at least part of the cooling air flow Y passes at least twice through said filaments, in two different positions along the extension of the plurality of filaments. In other words, the flow Y generated by the deflectors 17 crosses the filaments 11, arriving in the area 13; from here it re-crosses the filaments 11, exiting at least partly from the cooling chamber 10 through the ducts 14, due to the action of the extractors 14a.

As mentioned above, in the embodiment shown in FIGS. 1 and 2, the area 13 for expansion of the air heated by the passage through the filaments is located between the two bundles of filaments 11 and corresponds to the space of the chamber 10 below the non-perforated area 9 of the spinneret 2. Here the air heated by the passage through the filaments slows down and is re-conveyed at least partly through the same bundle of filaments, at a lower speed than the inlet speed through the holes 13. This permits improved cooling of the filaments that have just left the extruder spinneret 3, as they are treated with a flow of air suited to their plastic state.

As shown in the figures, in addition to the cooling air flow Y, directed at an angle towards the spinneret 2, the cooling chamber can provide a further flow X, obtained from the same flow XY generated by the fans or blowers 15; the flow X is directed onto the filaments 11 in a substantially horizontal direction and after crossing them it will locate in the expansion area below the expansion area of the air flow Y.

Figure 1A:
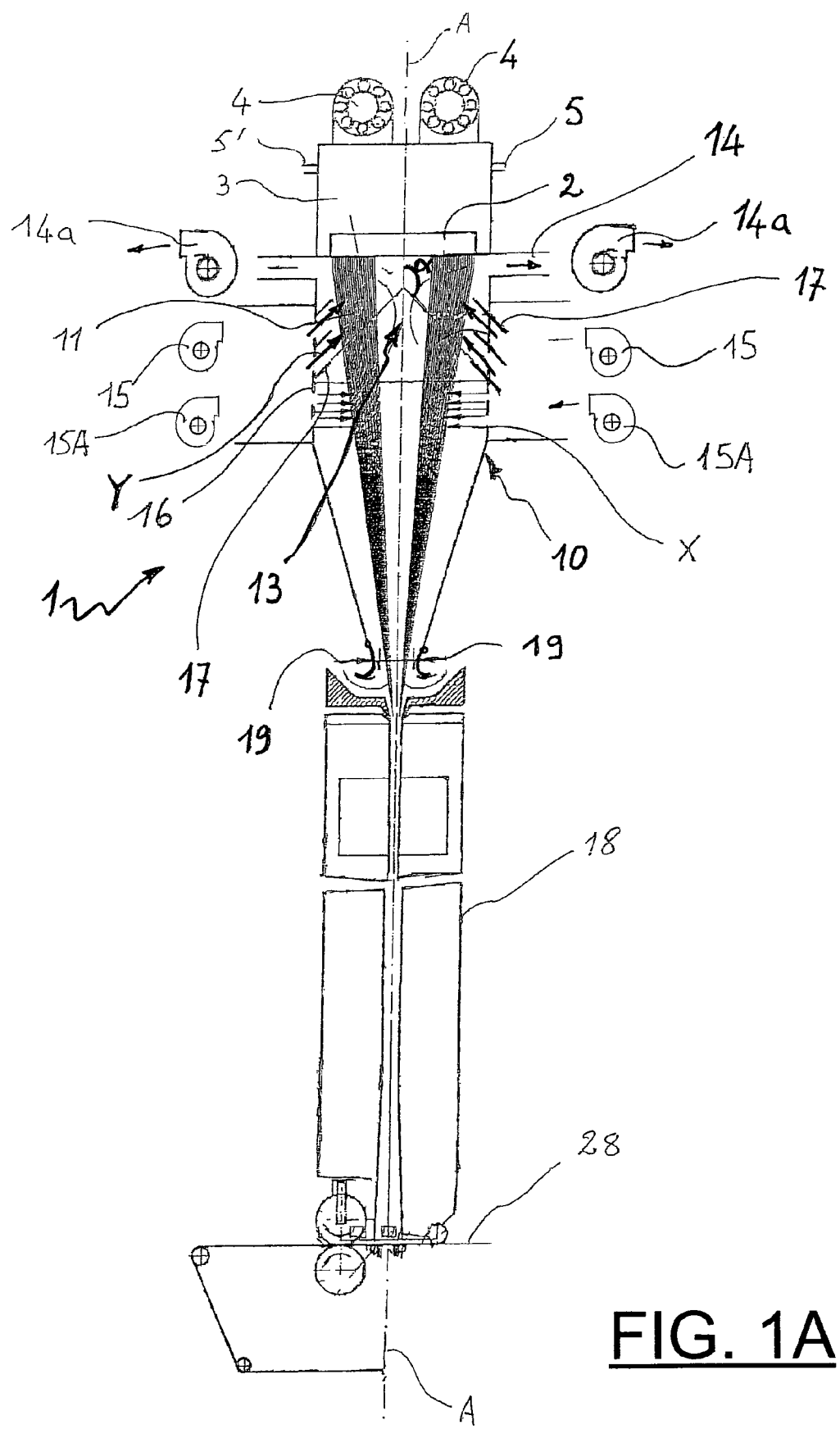
FIG. 1A is a schematic lateral view of a variation of the apparatus of FIG. 1.

FIG. 1A shows a variation of the embodiment described above, in which, according to the precepts of the Italian patent IT 1245831, the flow X and the flow Y have different characteristics and are generated by two different fans, or blowers. In particular, the cooling air flow Y is generated by the fans or blowers 15 while the flow X is generated by distinct and separate fans 15A; the flow X will have a different temperature from that of the flow Y (generally lower). Also the speed of the flow Y can be different from that of the flow X and in general will be higher than the latter.

The flow X will have a flow rate within the range of 20% to 50% of the total flow of cooling air sent to the chamber 10.

During operation of the cooling chamber, the air exiting the fans 5 passes through the holes provided in the wall 16 of the cooling chamber 10 and is at least in part (flow Y) directed by the deflectors 17 towards an intermediate area 13 located between the two bundles of filaments 11.

The humidity and temperature of the cooling air will be controlled, in particular the temperature will be within the range of 20° to 75° C. and the relative humidity within the range of 30% to 80%. The fans 15 generate a flow with controlled and adjustable pressure and speed; the speed is preferably within the range of 0.5 to 3.6 m/s, preferably within the range of 0.8 to 2.5 m/s. The pressure is within the range of 400 to 1800 Pa.

Figure 3:
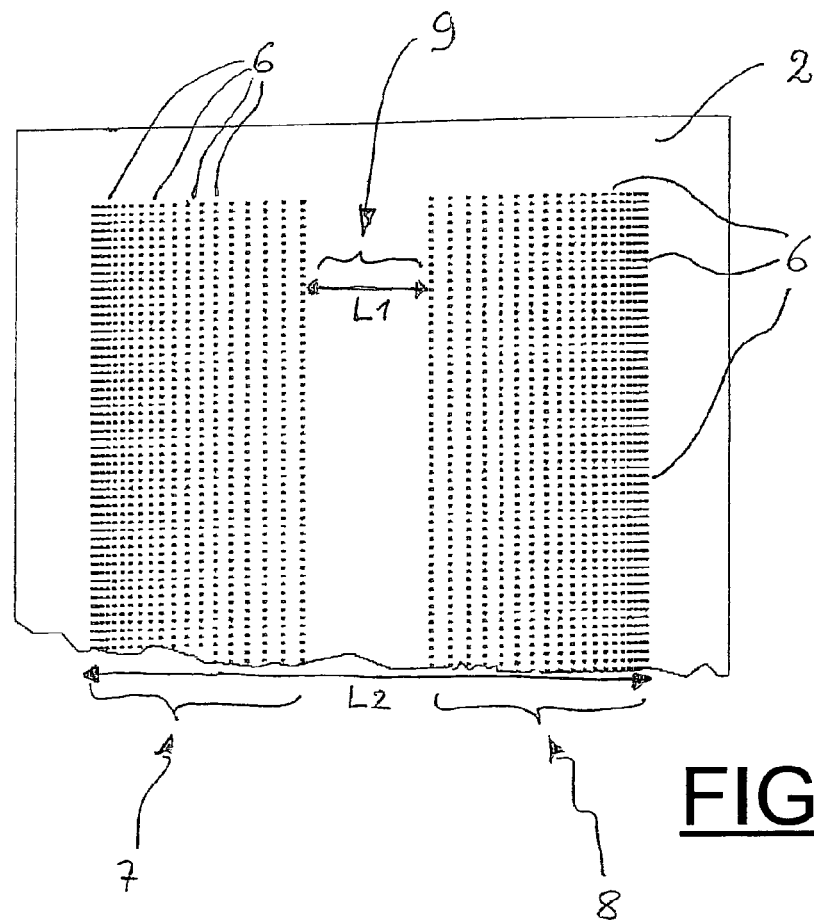
FIG. 3 is a partial view from below of the spinneret according to the present invention.

The filaments 11 crossed by the flow Y have a temperature that depends on the type of thermoplastic material used and is generally within the range of approximately 210° C. to 335° C. They release heat to the air that crosses and cool them and said air consequently expands in the expansion area 13; the arrangement of the holes shown in FIG. 3, i.e. with distance between the adjacent holes increasing with increasing distance from the external area towards the interior (adjacent to the non-perforated area 9) of the spinneret, facilitates the passage of the cooling air through the filament bundle; said air expands on contact with the first outermost filaments 11. During this first crossing of the filaments by the air which passes from the holes on the wall 16 to the expansion area 13, the air of the flow Y receives heat but is still able to cool, to a lesser extent, the filaments at the point corresponding to the second crossing of the filament bundles, when the air passes from the expansion area 13 to the suction ducts 14. Said second crossing point is located at a distance from the spinneret generally within the range of 50 to 250 mm; said distance can be regulated and modified by adjusting the angle of the deflectors 17, which are therefore fitted on the wall 16 in an adjustable manner.

In this way the same cooling air flow Y crosses and cools the extruded filaments twice in succession. This fact is important since in said area within the range of 50 to 250 mm below the spinneret, the temperature of the cooling flow must not be too low in order not to block the stretching and the surface oxidation reaction of the polymer with which the filaments are produced.

The use of two flows Y and X results into a further advantage: the flow Y, slanting with respect to the axis A-A, follows a longer path to reach the expansion area 13 and therefore arrives in said area at a lower speed than that of the flow X which, being directed horizontally, has a shorter path and reaches its expansion area 13A at a higher speed. The static pressure will therefore be different in the two areas, lower in 13 than in 13A; in this way a depression area is created below the spinneret 2 located above an area under pressure corresponding to the area 13A. This distribution of the pressure field facilitates re-crossing of the filaments by the cooling air flow.

Figure 13:
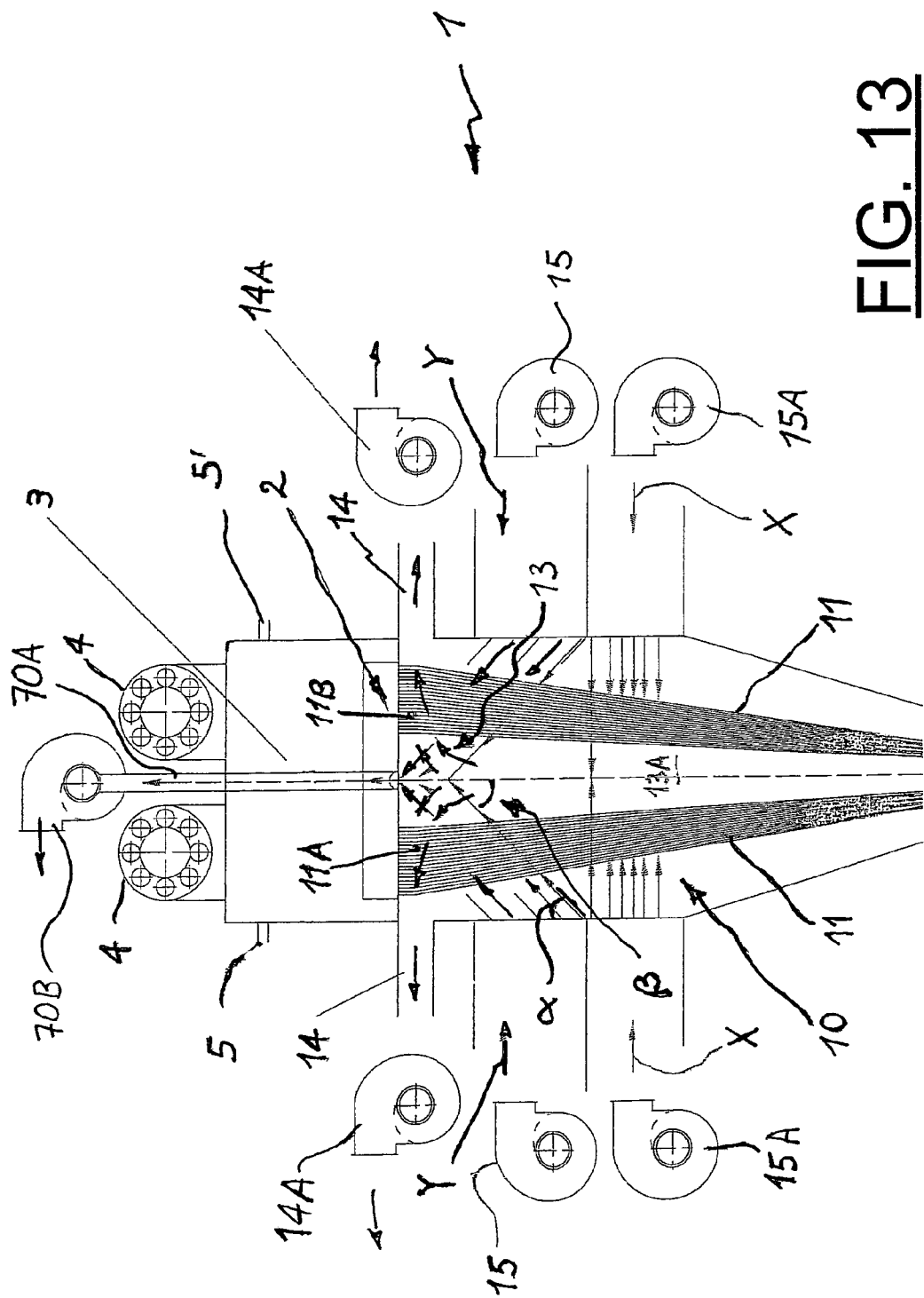
FIG. 13 is an enlarged view of a variation of the cooling chamber of the apparatus in accordance with FIG. 1.
Figure 14:
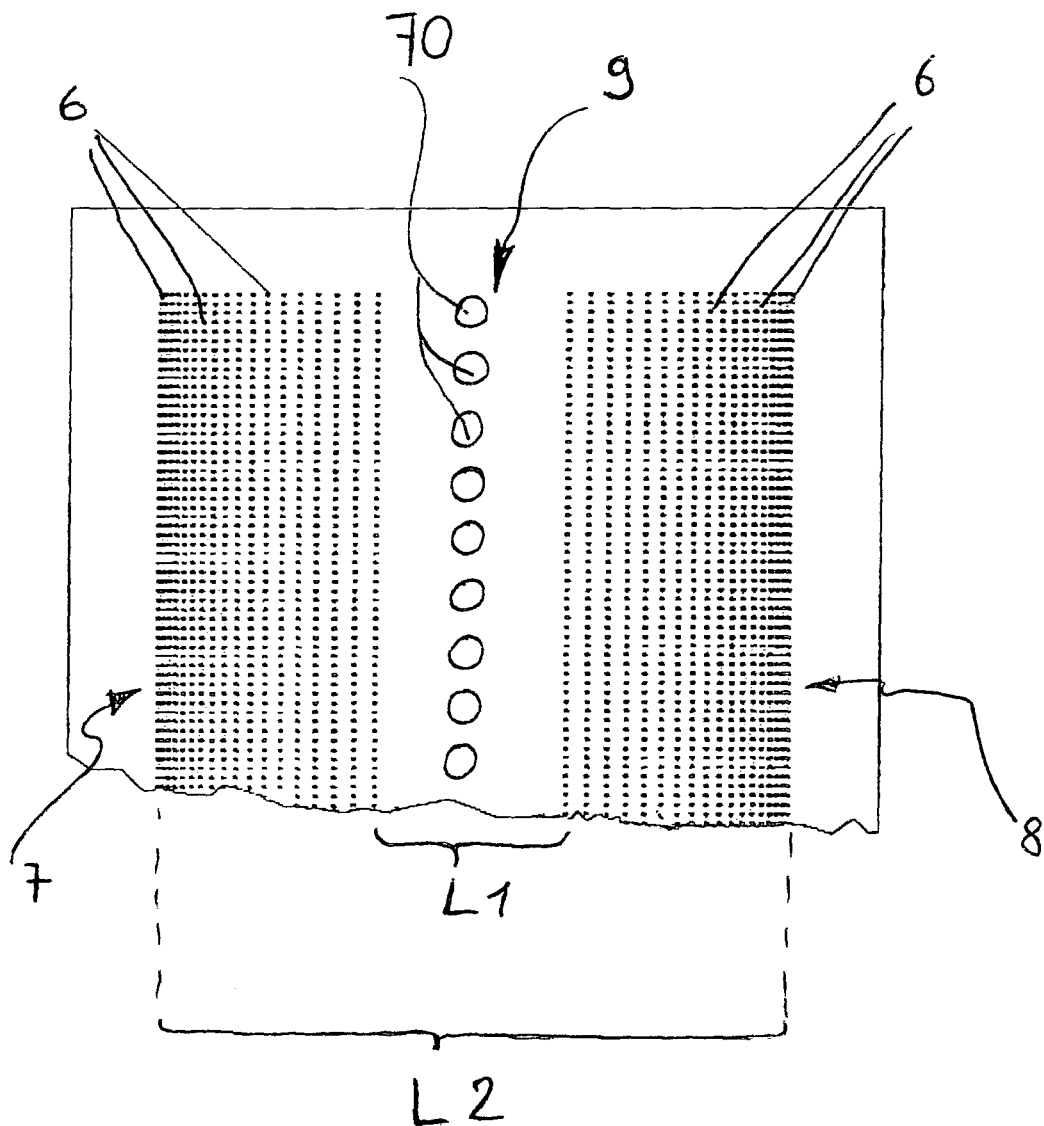
FIG. 14 is a partial view from below of the extrusion head, including the spinnerets, of the variation in accordance with FIG. 13.

FIGS. 13 and 14 refer to a preferential embodiment of the apparatus according to the present invention (the same reference numbers have been used to indicate parts equivalent to those shown in FIGS. 1-12). In this embodiment, in addition to the ducts 14, there are further holes 70 and outlet ducts 70A, for removal of the cooling air, heated after passing through the filaments. The holes and relative ducts 70A are arranged on the spinneret 2 in area 9 thereof, i.e. the area of the spinneret between the two groups 8 and 8' of filament extrusion holes 6.

As shown in FIG. 14, the area 9 of the spinneret is provided with a plurality of holes 70 which form a series of outlets for part of the cooling air; corresponding air suction channels 70A, connected to an extractor 70B or analogous suction means, are connected to the holes 70. In this way, in the area of the spinneret located between the two filament bundles 11, generally in the centre of the spinneret, a depression area is created where both the process fumes and part of the air heated by its passage through the filaments, both of which are harmful to the controlled cooling step, are removed from the area immediately surrounding the polymer outlet.

The holes 70 and the corresponding channels or ducts 70A are shown in FIG. 13 arranged in a straight row and have a circular section, but they can be arranged in several rows, straight or otherwise, parallel or non-parallel to the spinneret and can have sections different from the circular section shown. The number and section of the ducts 70A for removal of air and fumes from the cooling chamber 10 are calculated to limit the pressure losses and to provide an overall flow rate sufficient to remove from chamber 10 at least 15%, generally up to 40%, of the total cooling air conveyed into the chamber 10 by the fans 15 and 15'. Preferably, the ducts 70A are thermally insulated.

Analogously to what is described above, in the embodiment shown in FIGS. 13 and 14, the humidity and temperature of the cooling air will be controlled, in particular the temperature will be within the range of 7° C. to 75° C. and the relative humidity within the range of 30% to 80%. The fans 15 generate a flow with controlled adjustable pressure and speed; the speed is preferably within the range of 0.5 to 3.6 m/s, preferably within the range of 0.8 to 2.5 m/s. The pressure is within the range of 400 to 1800 Pa. The suction fans 70B and 14A also have adjustable flow rate and pressure.

The filaments 11 that are crossed by the flow Y have a temperature that depends on the type of thermoplastic material used and is in general within the range of approximately 210° C. to 335° C. They release heat to the air that crosses them, which cools them and consequently expands in the expansion area 13; the arrangement of the extrusion holes 6 shown in FIG. 14, i.e. with distance between the adjacent holes increasing with increasing distance from the external area towards the interior (adjacent to the central area 9) of the spinneret, facilitates the passage of the cooling air through the filament bundle, the air expanding on contact with the first outermost filaments 11. During this first passage of the air through the filaments, in which the air passes from the holes on the wall 16 to the expansion area 13, the air flow Y receives heat but is still able to cool, to a lesser extent, the filaments at the point corresponding to the second crossing of the filament bundles, when the air passes from the expansion area 13 to the suction ducts 14. Said second crossing point is generally located at a distance within the range of 50 to 250 mm from the spinneret; said distance can be regulated and modified by adjusting the angle of the deflectors 17, which are therefore fitted on the wall 16 in an adjustable manner.

Also in this embodiment, the same cooling air flow Y crosses and cools the extruded filaments twice in succession, as described for the embodiment of FIGS. 1-12.

As described above, at least 15% and in general 25% to 40% of the overall flow of the fans is removed from the cooling chamber 10 via the holes 70 and the ducts 7A.

Also the embodiment illustrated in FIGS. 13 and 14 provides for gradual cooling by recirculation of air and very stable stretching and spinning of the thermoplastic filaments; in particular, it is possible to obtain very fine counts, for example up to 0.9 dtex for mono-component filaments and up to 0.05-0.3 dtex for bi-component and split side-by-side filaments. Furthermore suction of the air from the expansion area 13, through the holes 70 and the ducts 70A, permits minimisation of the presence of monomers in said area, with clear advantages for the quality of the filaments and stability of the spinning process, and also allows for optimisation of the thermal gradients in the cooling chamber.

The gradual cooling process by recirculation of air according to the present invention provides very stable stretching and spinning of the thermoplastic filaments; in particular, it is possible to obtain very fine counts, for example up to 0.9 dtex for mono-component filaments and up to 0.05-0.3 dtex for bi-component and split side-by-side filaments.

In addition to regulation of the pressure and flow rate of the fans 15, 15A and where necessary 14a and 70B, to prevent the onset of turbulence in the cooling chamber 10, at the outlet of the same, flow regulators 19 are provided comprising oscillating portions 21 which cooperate with a flow deflector 20 located at the cooling chamber outlet.

Figure 4:
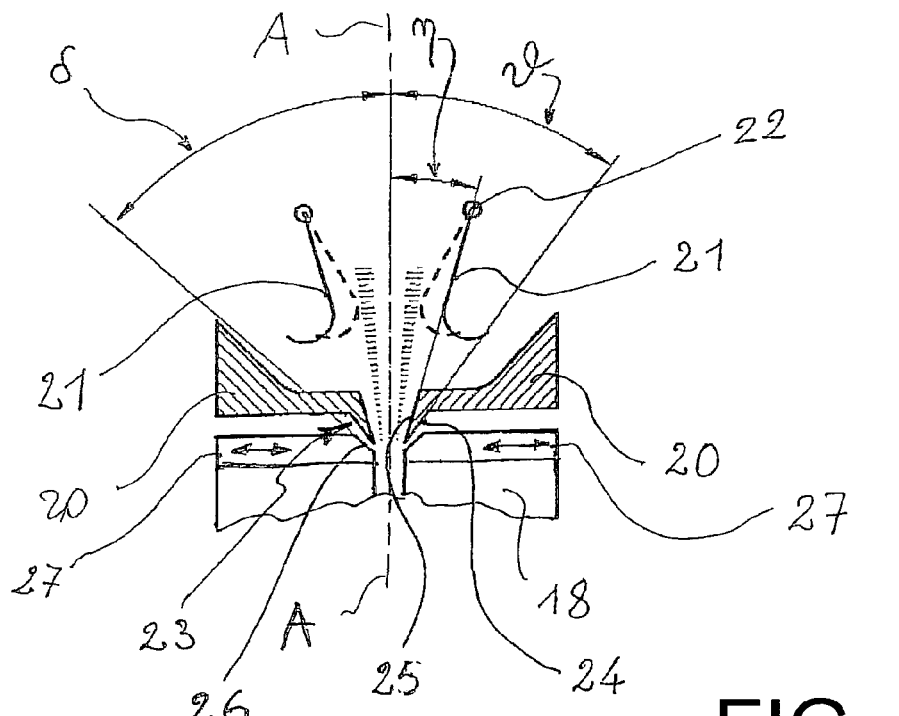
FIG. 4 is an enlarged view of the outlet portion of the cooling chamber according to the invention.

FIG. 4 shows the structure of the flow regulation complex at the outlet of the chamber 10: one part of the cooling flow flows out into the ambient atmosphere and one part is dragged into the stretching duct 18. As mentioned above, the flow regulators 19 comprise oscillating portions 21 hinged at 22 onto the wall 16 of the chamber 10. The position, or angle, of the oscillating portions 21 is controlled by means of actuators 23 (FIG. 2); the oscillating portions 21 are provided with a flat portion and an end curving outwards. The angle n formed by the plane of the flat part of the portion 21 with the axis A-A is within the range of 2 to 30 degrees, preferably within the range of 5 to 20 degrees.

The oscillating portions 21 cooperate with the flow deflector 20, which has a central conical portion 23 tapering towards the mouth of the stretching duct 18. The planes corresponding to the inner wall 25 and to the outer wall 24 of said conical portion 23 form with the axis A-A angles η and θ respectively within the range of 3 to 25 degrees, preferably within the range of 9 to 15 degrees, for the angle η and within the range of 12 to 35 degrees, preferably 20-24 degrees, for the angle θ.

The inlet to the stretching duct 18 has a tapered portion with walls 26 facing the conical portion 23 and forming with the axis A-A an angle δ within the range of 12 to 35 degrees, preferably within the range of 18 to 22 degrees. The tapered walls 26 of the duct 18 are part of sections 27 of duct 18 fitted in a horizontally mobile manner in order to vary the distance between the walls 26 and the walls 24 of the flow deflector 20. The minimum distance of the walls is within the range of 15 to 30 mm and preferably within the range of 20 to 24 mm. The structure described above thus forms a Venturi system that can generate an influx of air into the duct 18 with adjustable speed, generally within the range of 30 to 45 m/s.

After being passed into the stretching channel 18, the filaments are deposited on a mobile support 28 and calendered between one or more rolls 29 to form the non-woven fabric.

As mentioned above, the device of the invention enables very fine counts to be obtained, for example up to 0.9 dtex for mono-component filaments and up to 0.05-0.3 dtex for bi-component and splittable side-by-side filaments. FIGS. 5-11 show yarn structures that can be obtained with the method and device according to the invention.

Figure 5:
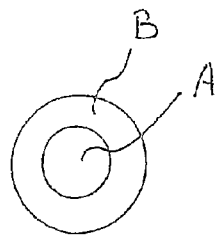
FIGS. 5 to 11 are section views of fibres that can be obtained with the method and device according to the present invention.
Figure 6:
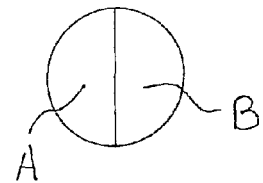
Figure 9:
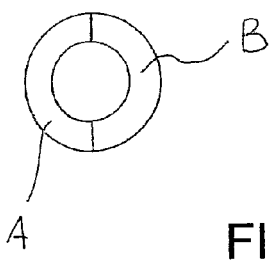

FIG. 5 shows a known yarn, comprising a core portion A and a sheath portion B; in FIG. 6, the portions of polymer A and B are in the side-by-side arrangement, also known, in particular for splittable fibres, i.e. fibres that are split after being collected on the belt 28 and then treated "mechanically", for example with jets of water. FIG. 9 shows a side-by-side embodiment in which the central portion of the filament is absent.

Figure 7:
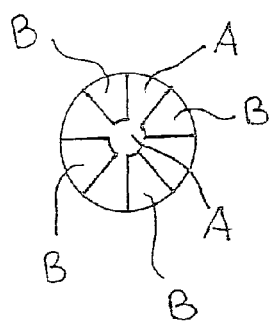
Figure 8:
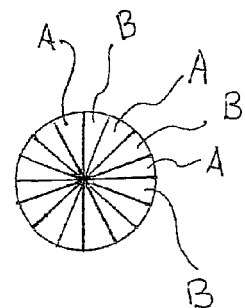
Figure 10:
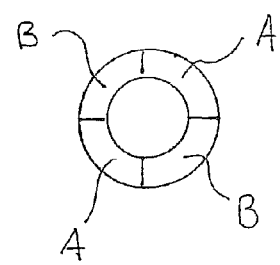
Figure 11:
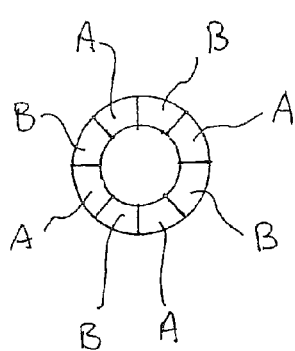

Further embodiments, so far not known, are shown in FIGS. 7 and 8 and in the corresponding hollow embodiments of FIGS. 10 and 11. In these embodiments, the yarn consists of a plurality of adjacent portions, arranged radially and alternating with one another, of polymer A and polymer B. A central core can be present (FIG. 7) or absent (FIG. 8, 10, 11). The yarns shown are obtained by spinnerets of the type shown in the U.S. Pat. No. 6,168,409 and EP0995822, modified with the addition of a suitable number of radial channels which connect the inner part of the flexible duct 138 (FIG. 12) to the surrounding duct 140 of the first spinneret 110. For example, the polymer A in FIG. 7 is present in five peripheral portions and therefore five channels will be present in the flexible duct 138 connecting the inside of the same to the surrounding duct 140.

The above applies, mutatis mutandis, also to the other embodiments shown; if a central core is not required, the lower nozzle 144 of the duct 138 is not present and the polymer A flows out of the flexible duct 138 through channels obtained in the wall of the duct 138.

The polymers A and B are preferably of the non-compatible type in order to ensure optimal division of the yarn into many smaller fibres during the yarn splitting step.

The invention claimed is:

1. An apparatus for the production of a non-woven fabric of filaments, comprising a spinneret (2) to extrude a plurality of filaments (11), a cooling chamber (10) to cool said filaments by means of cooling air flows, a stretching duct (18) located below the cooling chamber (10) to stretch said filaments (11), means for depositing the stretched filaments on a support (28), inlet means (15, 15A) for at least one cooling air flow (Y, X) which crosses said filaments at least twice, in two different positions of the plurality of filaments (11), wherein said extrusion spinneret comprises a plurality of extrusion holes (6) from which are extruded two groups of the filaments (11) that are initially substantially parallel with each other, said extrusion holes being distributed in at least two spaced groups (7, 8) to define an area (9) of the spinneret (2) without the extrusion holes (6) and an intermediate area (13) that is located below said portion of the spinneret (9) without the extrusion holes (6) and is a free space of the cooling chamber (10) without filaments, and in that said cooling chamber comprises inlet means for said at least one flow of cooling air directed towards said intermediate area (13) by crossing one of the two groups of filaments (11), and outlet means (14, 14a; 70,70A) for removal of at least part of said cooling air flow or flows from said cooling chamber, said at least one flow of cooling air (Y) re-crossing the one of the two groups of filaments from said intermediate area (13), said outlet means (14, 14a; 70, 70A) being located above said inlet means (15, 15A).

2. The apparatus according to claim 1, wherein said groups (7, 8) of extrusion holes (6) are spaced from each other (L1) to extrude two separate and spaced groups of filaments (11) and to provide between said groups, below the spinneret, a space sufficient to define said intermediate area (13), to permit, at least partly, expansion of the air heated by its passage through the filaments (11).

3. The apparatus according to claim 1, wherein said inlet means for said air flow (Y) comprise deflectors (17) to direct said flow (Y) at an angle onto said filaments, towards the upper portion of said cooling chamber (10).

4. The apparatus according to claim 3, wherein said deflectors (17) form with the vertical plane of the cooling chamber an angle within the range of 15 to 40 degrees.

5. The apparatus according to claim 1, wherein said spinneret (2) has two groups of holes (6) separated from each other by the area (9) without holes, the width of which (L1) is within the range of 15% to 28% of the sum of the total widths of the areas with holes and without holes (L2).

6. The apparatus according to claim 1, wherein said spinneret comprises one or more outlets (70, 70A) arranged on said spinneret between said groups (7, 8) of extrusion holes (6) for the removal of at least part of said cooling air flow from said cooling chamber.

7. The apparatus according to claim 6, wherein said one or more outlets (70, 70A) are provided in the spinneret, in said area (9) without holes.

* * * * *